Dec. 2, 1941.    W. R. SPILLER    2,264,776
AUTOMATIC STITCHING MACHINE
Filed Aug. 9, 1940    5 Sheets-Sheet 1

INVENTOR.
WILLIAM R. SPILLER
BY
Kwis Hudson & Kent
ATTORNEYS

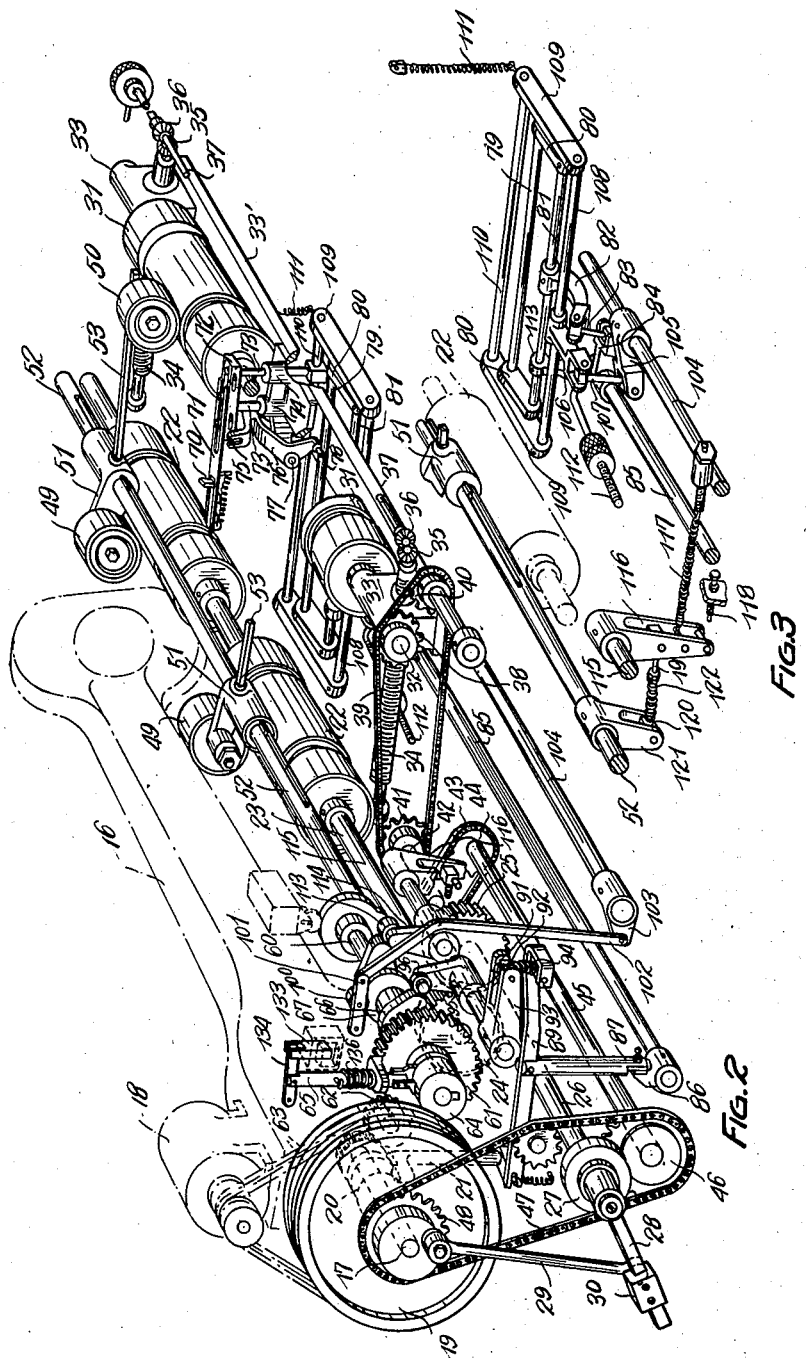

Dec. 2, 1941.  W. R. SPILLER  2,264,776
AUTOMATIC STITCHING MACHINE
Filed Aug. 9, 1940  5 Sheets-Sheet 4

INVENTOR.
WILLIAM R. SPILLER
BY
Kwis Hudson & Kent
ATTORNEYS

Patented Dec. 2, 1941

2,264,776

UNITED STATES PATENT OFFICE 2,264,776

AUTOMATIC STITCHING MACHINE

William R. Spiller, Dayton, Ohio, assignor to Harris - Seybold - Potter Company, Cleveland, Ohio, a corporation of Delaware Application August 9, 1940, Serial No. 352,001

19 Claims. (Cl. 1—11)

This invention relates to improvements in automatic stitching machines, particularly machines employing a single stitcher head functioning alternately with a work feeding means for making a row or series of stitches, where the introduction of a work piece into the machine inaugurates the alternate operation of the stitcher and feeder and where the operation of those mechanisms is discontinued automatically after the last stitch is taken.

In the copending application, Serial No. 326,934, of Paul E. Flowers and Elmo P. Crim, filed March 30, 1900, on a similar machine, a predetermined number of stitches are taken for any given set-up of the machine, the machine including a control mechanism which is geared thereto and is effective throughout any given work cycle, so that after a predetermined number of stitches has been taken the machine stops automatically. In the machine of the present invention the number of stitches is not predetermined. It depends upon the length of the work or that part of the work in which stitches are to be taken. It is therefore possible to put through the machine consecutively two pieces of work that differ materially in length without any change of adjustment in the machine.

One of the objects of the invention therefore is the provision of an automatic stitching machine having the capacity for handling work pieces of varying length.

Another object of the invention is the provision of stopping mechanism under control of the work for discontinuing the operation of the stitching and feeding mechanisms.

Another object is the provision of a machine of the character stated which after being set in operation by the insertion of a work piece remains in operation for an indefinite period and for the making of an indefinite number of stitches dependent only upon the dimensions of the work parallel to its line of travel.

Another object is the provision of stopping means which shall be pre-set by work travel to make a predetermined number of stitches, preferably two, after the stopping action is inaugurated.

A further object is the provision of stopping means comprising an electric circuit which includes one or more contact fingers that are deflected by the work and resume normal position when the rear end of the work passes them.

Still another object is the provision of two such fingers adapted to be engaged by a side wall and a seam flap of a paper box blank, the finger first to be released by the work serving to inaugurate the stopping action, whereby the flap may be stitched inside or outside of the box.

Other objects and features of novelty will appear as I proceed with the description of that embodiment of the invention which, for the purposes of the present application, I have illustrated in the accompanying drawings, in which Fig. 1 is a fragmental perspective view of a machine embodying the invention shown in use for stitching the side seam of a paper box.

Fig. 2 is a perspective view showing particularly the work feeding and delivery mechanisms and the control parts which are located principally beneath the table of the machine.

Fig. 3 is a further fragmental perspective view of some of the control parts.

Figure 9:
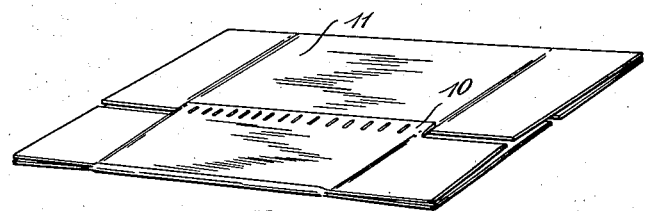
Fig. 9 is a perspective view of a box blank with a stitched side seam such as may be formed by the use of the machine of this invention with the stitcher head perpendicular to the direction of work travel.
Figure 7:
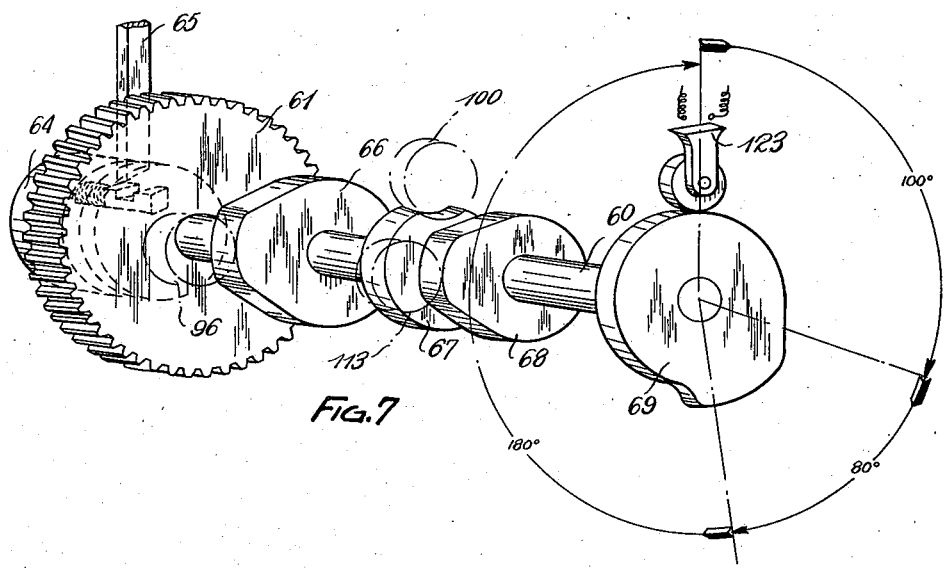
Fig. 7 is a diagrammatic perspective view of a cam shaft control mechanism.

The machine of this invention is adapted for use upon a variety of articles where it is necessary or desirable to form a plurality of stitches in rapid succession, but is shown herein for use in stitching the side seam of a fiber box such as that illustrated in Fig. 9, wherein a side flap 10 is stitched to the outer side of a wall 11 of the blank. Sometimes the flap is stitched inside the wall, and the machine of this invention is equally adapted to form a seam of that character. The machine is so constituted that it begins operation when the work piece is inserted, alternately forms stitches and feeds the work along a given amount and continues such stitching and feeding movements until the point for the last stitch approaches the stitching position, when the stopping action is inaugurated. The machine is preferably arranged to make a stitch, a final feed movement and a final stitch after the operation of the stopping mechanism is inaugurated.

Aside from the control means for stopping the feeding and stitching movements the machine of the present invention follows rather closely that disclosed in the copending application of Flowers and Crim above mentioned, to which reference may be had for a more detailed disclosure.

Figure 1:
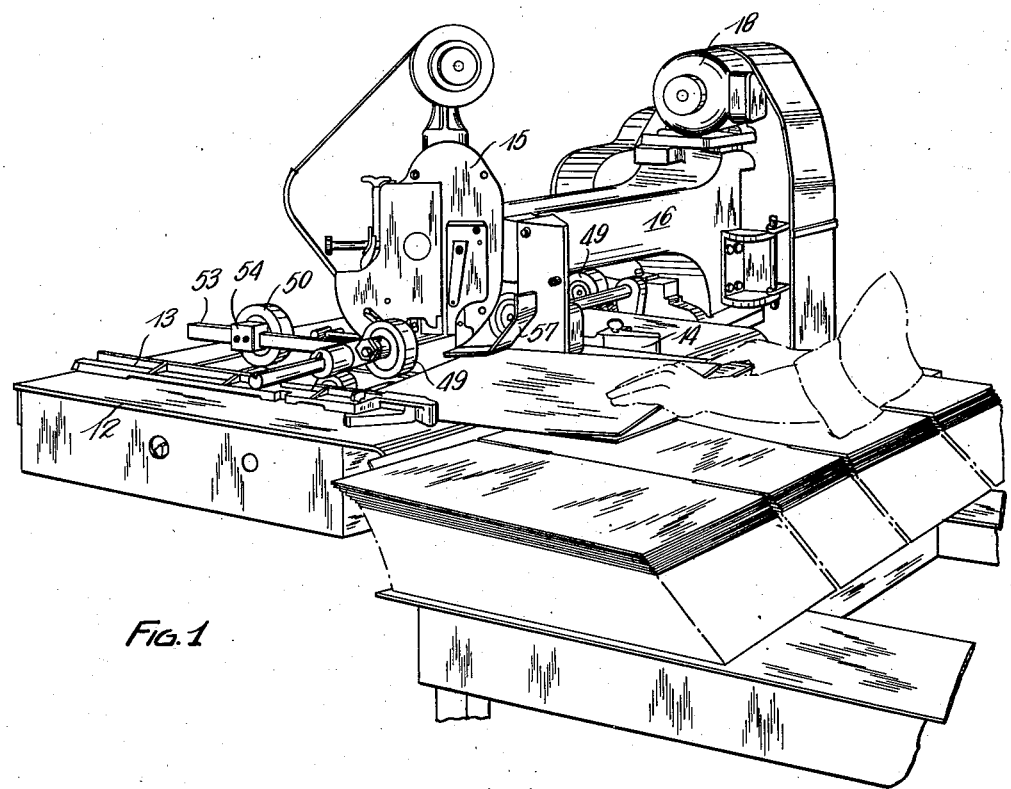

Referring to Fig. 1, the table of the machine is shown at 12. 13 and 14 are adjustable guides for engagement with the folded edges of the work. The stitcher head 15 is shown disposed at an angle of 45° with the direction of work travel, and is supported upon the free end of a hollow arm 16 through which the drive shaft for the stitching mechanism extends. This shaft is shown at 17 in Figs. 2 and 10, and is driven preferably by an electric motor 18 through plural belts running upon a fly-wheel 19 which is loose upon shaft 17 but is adapted to be locked thereto by a clutch 20 of any suitable design that may be disengaged by the upward movement of a throw-out rod 21.

A pair of feed rollers 22 are mounted below the surface of the table but project through slots in the table so as to be flush with the table surface. They are pinned on a shaft 23 which carries at one end a gear 24 that meshes with a gear 25 on another shaft 26, the latter shaft carrying one of the elements of a one-way clutch or ratchet 27 that is operated by a crank arm 28. The latter is oscillated by a connecting rod 29 eccentrically pivoted to shaft 17 and pivotally connected with a block 30 that is adjustably mounted on the arm 28 in order to vary the swing of that arm and the consequent feed impulse transmitted by shaft 26 to shaft 23.

A pair of delivery rollers 31 carried upon a shaft 32 are mounted for adjustment toward and away from the rollers 22, the shaft 32 being mounted in a pair of blocks 33 attached to an elongated plate 33', these parts being adjustable by means of screws 34 that may be turned simultaneously by means of bevel gears 35, 36, and a shaft 37, which is provided at one end with a knurled wheel for facilitating its rotation by an operator. The shaft 32 is driven continuously, and for this purpose is provided with a sprocket wheel 38 over which runs a chain 39. This chain runs over an idler sprocket 40 and a sprocket 41 mounted on a short shaft 42 which also carries another sprocket, not herein illustrated, over which runs a chain 43 that is driven by a sprocket 44 on a shaft 45, the latter shaft carrying a sprocket 46 that is driven by a chain 47 from a sprocket 48 which turns with fly-wheel 19. The three chains 47, 43 and 39 therefore run continuously, and the rollers 31 are driven continuously regardless of their position of adjustment.

The feed rollers 22 are made effective by a pair of drop rolls 49 which engage the work directly above the feed rollers and exert sufficient pressure to insure good traction, and a pair of drop rolls 50 only one of which is illustrated in Fig. 2 serve when lowered to press the work against delivery rollers 31 and to carry it rapidly out of the machine. Rollers 49 are mounted on brackets 51 which are keyed to a rock shaft 52, being adjustable along that shaft so as to better accommodate work of different widths. These brackets carry rearward extensions 53 of rectangular cross section upon which are mounted adjustable blocks 54 that carry the drop rolls 50. The rolls 50 may therefore be readily adjusted to correspond with the adjustment of the rollers 31. At the start of a machine operation rock shaft 52 is oscillated by means presently to be described to lower the drop rolls 49. After the last stitch is made rock shaft 52 raises rolls 49 and lowers rolls 50.

Figure 4:
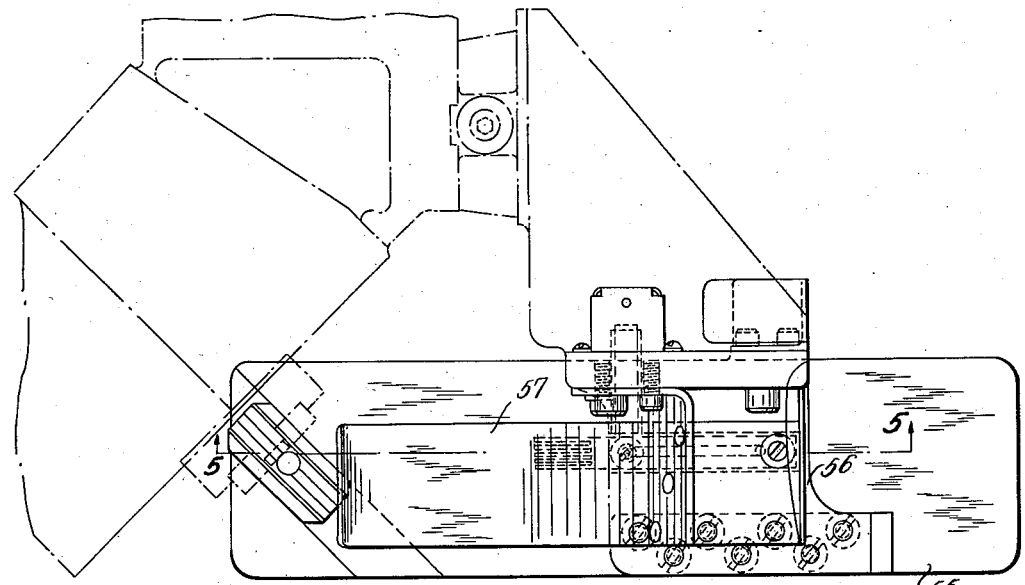
Fig. 4 is a plan view of the open head and anvil plate of the machine.
Figure 5:
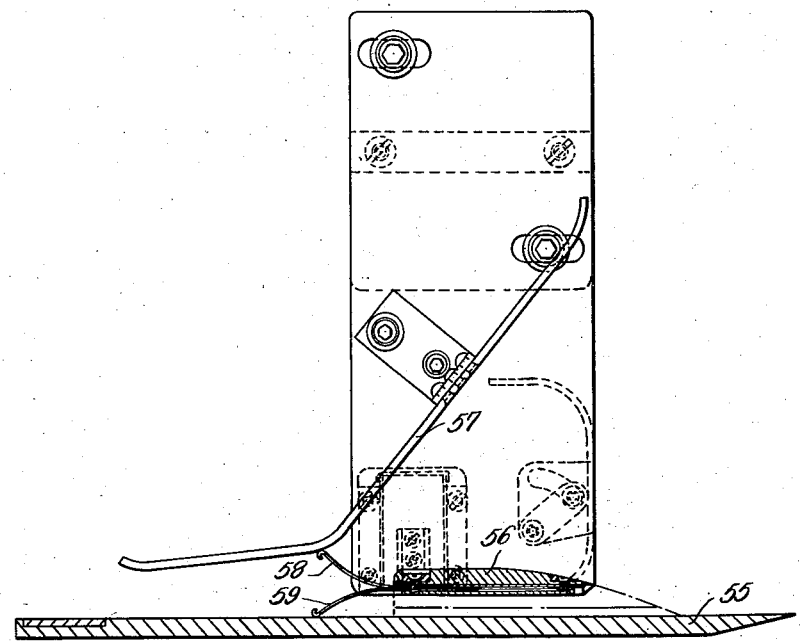
Fig. 5 is a vertical sectional view taken substantially on the line 5—5 of Fig. 4.
Figure 6:
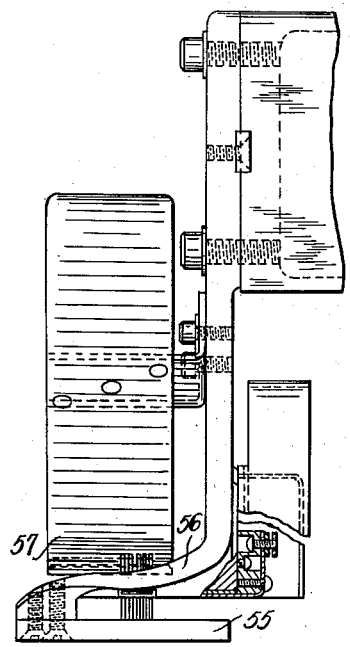
Fig. 6 is a front elevational view of the open head and associated parts.
Figure 8:
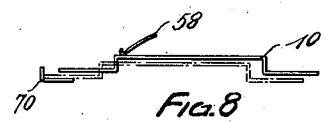
Fig. 8 is a diagrammatic view illustrating the order of operation of two elements of the control means.

Referring particularly to Figs. 4, 5 and 6, wherein the open head of the machine is illustrated, the anvil plate 55 is shown attached along one edge to the laterally and downwardly extending supporting arm 56. When a blank is inserted into the machine one of its elements, the flap 10 for example, is caused to ride over the arm 56, and another element, the side wall 11 for example, is caused to extend beneath the arm 56 and above the anvil plate 55. A guide plate 57 secured to the vertical part of arm 56 assists in directing the upper element or flap downwardly and also serves as an abutment for a spring finger 58 attached to arm 56 but insulated therefrom. A second spring finger 59 is also attached to and insulated from arm 56 and normally engages plate 55. Each of these fingers is adapted to be diverted from engagement with guide 57 or plate 55, as the case may be, by the respective blank elements to be stitched.

The machine is provided with a cam shaft 60 upon which a gear 61 turns freely, this gear being driven through an idler 62 from a pinion 63 fixed to shaft 17. As soon as shaft 17 is engaged gear 61 begins to turn. At that time it is locked to the shaft through a clutch 64 which however may be disengaged by a throw-out rod 65, as will presently appear.

Shaft 60 as herein constituted carries four cams 66, 67, 68 and 69, for controlling respectively the main clutch, the lowering and raising of the trigger presently to be described, the oscillation of rock shaft 52 by which the drop rolls are carried, and the electric circuit comprising part of the stopping means.

The main clutch 20 is engaged automatically when the work is inserted in the machine. This action is effected by a trip finger 70 which is so positioned as to be engaged by the forward edge of the box blank or other work when the latter is in proper position for the first stitch to be taken. The trip finger 70 is mounted upon a trip bar 71 that is slidable upon a supporting plate 72. This plate is carried at the upper ends of a pair of plungers 73 which are slidable up and down in guides 74 that are mounted upon plate 33'. Plate 72 is enabled by a pin and slot connection to move horizontally a short distance, and it does so each time a work piece is pushed against trip 70. When this occurs a pin 75 projecting laterally from the plate 72 into a bifurcation at the upper end of a bell crank lever 76, swings that lever upon its pivot 77 which causes a projection 78 on its free end to depress a rod 79 which is mounted by means of arms 80 to swing with an oscillatable shaft 81 carried by the frame of the machine. An arm 82 pinned to shaft 81, see Fig. 3, works through a link 83 to depress an arm 84 which is pinned to a shaft 85 extending in a direction at right angles to the path of travel of the work. On one end of shaft 85 there is pinned a trigger 86 which normally supports the lower end of a rod 87 that is pivotally connected with the central part of a lever 89. One end of lever 89 is connected preferably by a pivot and slot connection with the lower end of clutch throw-out rod 21, while at its opposite end lever 89 is formed as a yoke in which is fixed the lower extremity of a short post 91, the upper end of which projects through a hole in block 92 pivotally mounted at the free end of a bifurcated crank 93. Post 91 has a head on its upper extremity which takes the load when the lever 89 and crank 93 tend to separate. A coil spring 94 surrounding post 91 between the lever 89 and the crank 93 transmits motion from crank 93 to lever 89. On the same shaft with crank 93 there is another crank 95 carrying the follower 96 which runs upon cam 66 and acts to disengage the clutch at the end of a work operation, as will be explained hereinafter.

The second cam 67 acts to lower trip finger 70 out of the way of the work as soon as the main clutch is engaged. When the machine is idle a follower 100 rests in a depression in the cam. This follower is mounted intermediate the ends of a link 101 carried at one end upon a fixed pivot and connected at the other end with the upper extremity of a long link 102 that is pivoted at its lower extremity to a crank 103 on one end of a shaft 104. The latter shaft is connected by means of two cranks 105 and 106 and an intermediate link 107 with a shaft 108 supported in bearings in the machine frame. Shaft 108 has pinned thereto a pair of arms 109 which carry at their other extremities a rod 110. The lower ends of the plungers 73 are enlarged and have horizontal slots therein to receive rod 110, so that they move up and down whenever rod 110 so moves. Directly after the cam shaft starts rotation at the beginning of a work operation, follower 100 rides out of the depression in cam 67 and raises link 102, thereby oscillating shaft 104 clockwise which, through the connections previously described, depresses rod 110. Plungers 73 therefore descend and with them the plate 72, the trip finger bar 71 and the trip finger 70, a coil spring 111 opposing this movement.

As soon as the trip finger 70 is thus disengaged from the work a weighted arm 112 attached by a bracket 113 to shaft 81 works through that shaft and the connections 82, 83 and 84 to turn shaft 85 clockwise and thereby swing trigger 86 up into position to engage rod 87. At the same time rod 79 is raised and acts through projection 78, bell crank lever 76 and pin 75 to move trip bar 71 and trip finger 70 forward, so that they will be in operative position when the cam shaft finishes its revolution and the lowering of the follower 100 into the cavity of cam 67 permits spring 111 to raise rod 110, plungers 73 and the trip bar and trip finger.

The third cam 68 controls the oscillations of rock shaft 52 upon which the drop rolls are carried. In the idle position of the machine the high spot of this cam is in engagement with a follower 113 carried upon a crank 114 which is pinned to shaft 115. This shaft also has pinned thereto a bifurcated crank 116 which is urged in an anti-clockwise direction by a tension spring 117. The cam however prevents the spring 117 from acting to pull the crank 116 up against an adjustable stop 118. In the bifurcation of crank 116 there is pivoted one end of a rod 119 which extends loosely through a block 120 that is pivoted in a bifurcated crank 121 pinned to rock shaft 52. Rod 119 is headed so as to engage and pull upon block 120 when crank 116 swings anti-clockwise. A coil spring 122 surrounding rod 119 serves to transmit force to crank 121 when crank 116 swings in the clockwise direction.

In Figs. 2 and 3 the angular position of rock shaft 52 is such that drop rolls 50 are in operative relation with delivery rollers 31. As soon as the cam shaft starts its movement however the high spot of cam 68 moves out from under follower 113 permitting cranks 114 and 116 to turn anti-clockwise, which they do under the influence of spring 117, and this movement is communicated to crank 121 and shaft 52, whereby drop rolls 50 are raised and rolls 49 are lowered to operative position.

The fourth cam 69 is a cam which operates a switch 123 that is normally open but is closed when the high spot of the cam comes into engagement with the vertically movable switch element.

Figure 10:
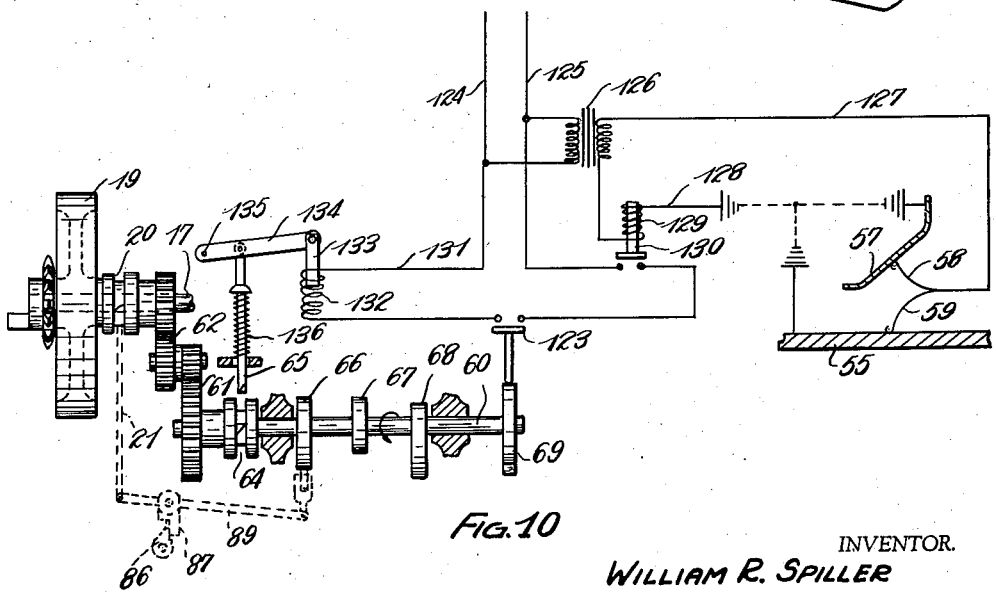
Fig. 10 is a diagrammatic view and wiring diagram illustrating a control mechanism and circuit which may be employed in connection with the invention.

Referring now to Fig. 10, 124 and 125 represent 115-volt conductors to which are connected a step-down transformer 126 for supplying low voltage current to a circuit comprising a conductor 127 leading to the two spring contact fingers 58 and 59. These fingers are normally in engagement with the grounded parts 57 and 55 respectively, while from ground another conductor 128 extends to a solenoid 129 and thence back to the transformer. When the low voltage circuit is energized, as it is normally, the relay 130 is raised and thereby maintains a high voltage circuit 131 open. In this latter circuit there is another solenoid 132 which when energized pulls down an armature 133, thereby swinging a lever 134 downwardly on its pivot 135 and depressing throw-out rod 65 against the action of spring 136.

*Operation.*—The insertion of a work piece into the machine first separates the fingers 58 and 59 from the guide 57 and the anvil plate 55, whereupon the relay 130 drops. Shortly thereafter the front edge of the work engages the trip finger 70, causing the engagement of the main clutch 20. Gear 61 then begins to turn and to rotate the cam shaft 60, the clutch 64 being normally in engagement, as by the action of a spring bolt. Immediately thereafter cam 67 functions to lower the drop finger 70 out of the way of the work, as previously described. Also immediately after the machine starts the high spot of cam 67 moves to permit spring 117 to swing the drop rolls 49 down to operative position and to raise drop rolls 50 away from operative position. Weighted arm 112 then turns shaft 85 to bring trigger 86 back into position to engage beneath rod 87 when that rod is lifted, as it will be as soon as the high spot of cam 66 moves away from the follower 96. The spring, not illustrated, which holds the follower 96 against the cam face then lifts crank 93 and lever 89 and thus rod 87. The stitching mechanism which is driven by shaft 17 and the intermittent feed which is driven by shaft 17 through the intermediary of shaft 26 are now functioning to form stitches and make feed movements alternately. The cam shaft 60 continues to turn through about a half revolution, when the high spot of cam 69 comes into position to close switch 123. This interrupts the operation of the control mechanism, for the circuit 131 is thereby completed and the solenoid 132 energized, which causes throw-out rod 65 to disengage clutch 64 against the action of spring 136. Cam shaft 60 then ceases to rotate and remains stationary while the stitching and feeding mechanisms continue to operate. The stitching and feeding movements continue for a time dependent upon the length of the work to be stitched, the travel of the work itself functioning at the proper time to inaugurate the operation of the stopping means, that is to say when one of the elements being stitched, a side seam flap for example, runs past one of the fingers 58 or 59 and permits that finger to establish the circuit 127 through ground. Then relay 129 is energized and the high voltage circuit 131 is broken. Solenoid 132 then ceases to act and spring 136 withdraws throw-out rod 65 so that clutch 64 again grips shaft 60 and the rotation of that shaft is resumed. This inaugurates the operation of the stopping mechanism. Switch 123 is then lowered to inoperative position ready for the next work operation. Cam shaft 60 turns through approximately 180°, during which time two more stitches and one more feeding operation are performed. At the end of the revolution of the cam shaft the high spot of cam 66 functions through the cranks 95 and 93 to swing lever 89 on its central pivot and thereby raise throw-out rod 21 to disengage the main clutch, when the stitching and feeding mechanisms of course cease to operate. The follower 100 at the same time comes to rest in the depression of cam 67, thereby permitting shaft 104 to turn counter-clockwise under the influence of spring 111 which raises the trip bar 71 and trip finger 70 to operative position. At this time also the high spot of cam 68, working through cranks 114, 116 and 121 oscillates rock shaft 52 to raise rolls 49 and lower rolls 50. The latter rolls then impart traction to the rollers 31 with which the work is in contact and these rollers, which rotate constantly, act to quickly deliver the work to a pile or to a conveyor, not shown. The machine is then in readiness for the introduction of another work piece. The machine functions rapidly enough so that it disposes of the work as quickly as the operator is able to fold the blanks and insert them into the machine.

Figure 11:
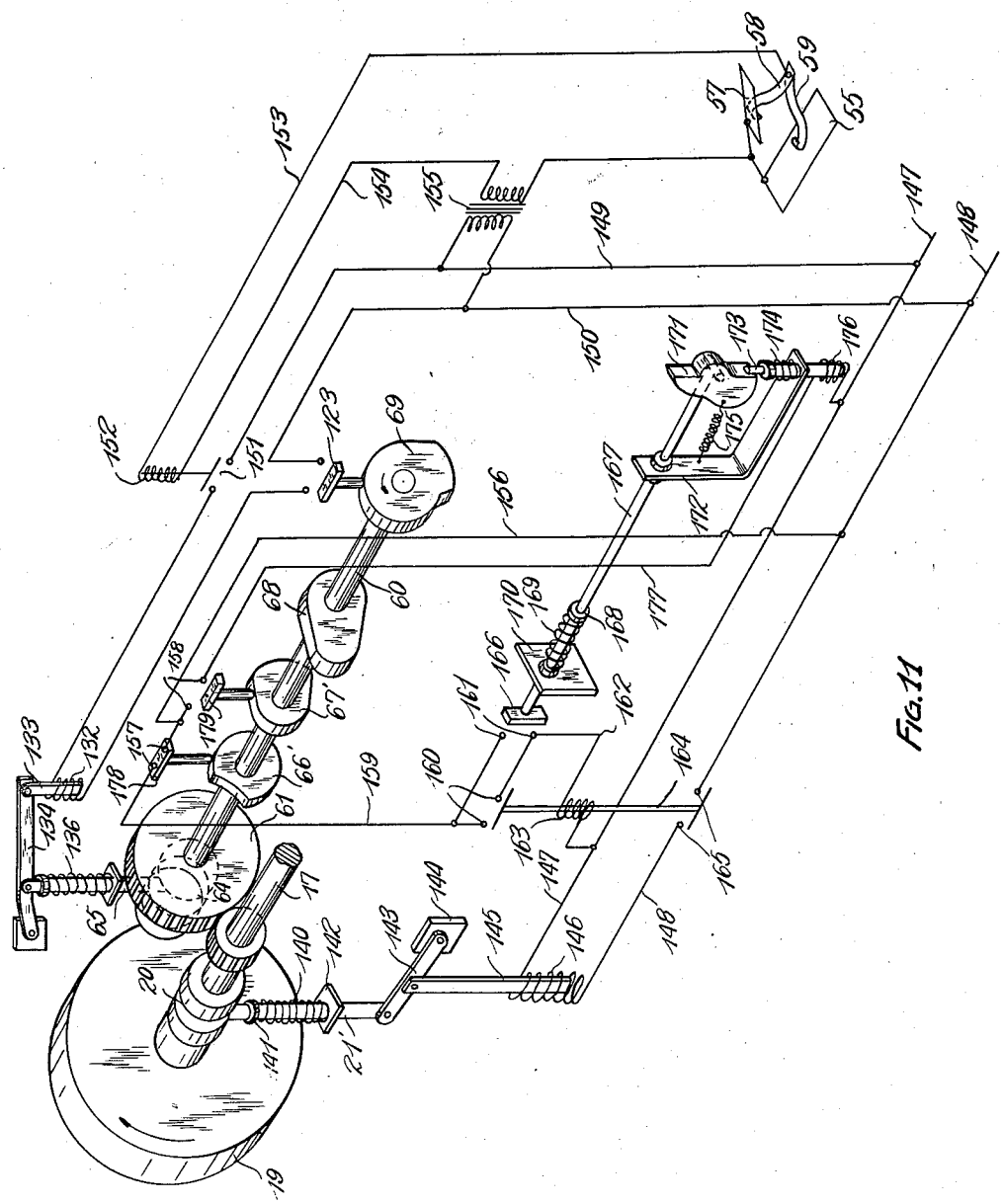
Fig. 11 is a perspective diagrammatic view of control mechanism and wiring connections of a modified form of the invention.

In the modification illustrated in Fig. 11, the means for operating the main clutch 20 is largely electrical rather than mechanical, as in the first described form of the invention. Also the clutch control cam 66 and the cam for withdrawing the trip finger are replaced by switch operating cams or timing wheels. The electrical connections are somewhat different than in Fig. 10, but in other respects the two systems are substantially the same.

In this figure the main clutch throw-out rod 21' is shown in the position for disengaging the clutch 20, being urged to that position by a coil spring 140 which surrounds the rod and bears at its upper end against a collar 141 on the rod and at its lower end against a fixed abutment 142. The lower end of rod 21' is pivotally connected to one end of a lever 143 the other end of which is pivotally mounted on a fixed element 144 of the machine. An armature 145 is connected to the lever 143 intermediate the ends of the latter, this armature cooperating with a solenoid 146 mounted between two electric conductors 147 and 148 which takes current from a service line. When solenoid 146 is energized, rod 21' is withdrawn downwardly and clutch 20 is engaged. When the solenoid is deenergized, spring 140 acts to disengage the clutch.

A pair of conductors 149 and 150 connect with the wires 147 and 148 and extend to solenoid 132 which when energized disengages clutch 64, the spring 136 acting to engage the clutch when the solenoid is deenergized. In conductor 149 there is a switch 151 controlled by a solenoid 152 in a low voltage circuit comprising conductors 153 and 154, the secondary of a step-down transformer 155, anvil plate 55, and spring finger 59. When the parts 55 and 59 as well as 57 and 58 are separated by a work piece, solenoid 152 is deenergized and switch 151 is closed. Conductor 150 also includes the switch 123 which is adapted to be closed by cam 69 as in the first described form of the invention.

Solenoid 146 controlling the main clutch is arranged to be energized by the introduction of work into the machine and to be deenergized by the action of a cam or timing wheel 66'. As in the first described form of the invention, the rotation of cam shaft 60 is begun at the beginning of a work cycle, is discontinued after about a half revolution, and is resumed when the work approaches the position for the last stitch, this resumption being controlled by the reengagement of spring finger 59 with plate 55 when the work travels out from between them.

From wire 148 a conductor 156 leads to one contact of each of two pairs of contacts 157 and 158. From the other contact 157 a conductor 159 extends to one of a pair of contacts 160 and to one of a pair of contacts 161. The remaining contacts of these two pairs are connected through a conductor 162 and a solenoid 163 to wire 147. An armature 164 controlled by solenoid 163 is adapted when the solenoid is energized to bridge contacts 160 and simultaneously to bridge a pair of contacts 165 in wire 148.

Contacts 161 are arranged to be bridged by a switch plate 166 on the end of a rod 167 which is slidably mounted in the machine. This rod carries a collar 168 which is engaged by a coil spring 169 that bears against an abutment 170, thereby tending to hold the switch plate 166 out of engagement with contacts 161. On the opposite end of rod 167 there is pivotally mounted a trip 171. A bracket 172 fixed on the rod carries an armature latch 173. This latch under the influence of a coil spring 174 tends to remain in the position illustrated. A tension spring 175 tends to maintain the trip 171 in the position shown. Latch 173 may be withdrawn from operative position by a solenoid 176 connected into a conductor 177 which extends upwardly to one of the contacts 158. Contacts 157 are normally bridged by a switch plate 178 which bears upon the cam or timing wheel 66', and contacts 158 are arranged to be opened or closed by a switch plate 179 which bears upon a cam or timing wheel 67'.

In this form of the invention, when the operator inserts a work piece into the machine, the spring fingers 58 and 59 are separated from the plates 55 and 57 thereby causing the closing of switch 151. The movement of the work piece a little further causes its forward edge to engage trip 171 above its pivot. Since the trip is then held by latch 173 from turning on its pivot, the rod 167 with its bracket 172 and the latch 173 with the solenoid 176 all move toward the left against the action of spring 169, closing the contacts 161. A circuit is thereby set up from wire 148 through conductor 156, closed contacts 157, conductor 159, contacts 161, conductor 162 to solenoid 163 and back to wire 147. This closes contacts 165 and contacts 160. Solenoid 146 is thereby energized and the main clutch is engaged. Shaft 17 then begins to rotate and to cause the rotation of shaft 60. Switch plate 179 then rises and bridges contacts 158 which energizes solenoid 176, withdrawing latch 173. The stitching and feeding operations begin. The first feed movement causes the work to swing trip 171 down about its pivot, after which the rod 167 returns to its original position under the influence of spring 169. This breaks the circuit at contacts 161, but the circuit through solenoid 163 is locked in at the contacts 160 and accordingly the contacts 165 remain bridged. The alternate stitching and feeding operations continue and cam shaft 60 revolves through part of a revolution or until switch 123 closes under the action of cam 69. Thereupon solenoid 132 is energized and clutch 65 is disengaged, stopping the rotation of cam shaft 60. The machine continues to operate alternately stitching and feeding the work until the travel of the tail end of the work out from between one or the other of fingers 58 and 59 and its plate 55 or 57 completes the circuit through solenoid 152, thereby opening the circuit through solenoid 132, which permits spring 136 to again cause the engagement of clutch 64. The shaft 60 then resumes its rotation, switch plate 179 descends to deenergize solenoid 176 and permit latch 173 to rise to operative position. Switch 123 also opens. Near the end of the revolution of shaft 60 the depression in cam 66' separates contacts 157, causing deenergization of solenoid 163 and the consequent opening of the contacts 165 and deenergization of main clutch solenoid 146. Spring 140 then raises rod 121' into position to disengage the clutch after a further portion of a revolution of shaft 17, which further portion carries the depression in cam 66' past the switch plate 178, so that contacts 157 are again engaged before rotation stops. Also cam 68 acts to raise drop rollers 49 and lower drop rollers 50 to make effective the action of delivery rollers 31, as heretofore described.

It will be observed that in stitching the side seam of a box that one of the fingers 58 and 59 which rides upon the flap is the one which inaugurates the stopping action. Since there are two of these fingers positioned at the same point in the path of travel of the work the flap may be caused to lie either inside or outside of the box without affecting the control of the stopping mechanism.

While in the foregoing description and in the accompanying drawings I have disclosed more or less in detail certain particular embodiments of my invention, I desire it to be understood that such detailed disclosure is for the purpose primarily of complying with the requirements of the statute, the scope of the invention being determined by the appended claims.

Having thus described my invention, I claim:

1. In an automatic wire stitcher, a shaft, work feeding mechanism and work stitching mechanism arranged to be operated alternately through said shaft, means set in motion by the introduction of work into the machine for applying power to said shaft, and means dependent upon work travel subsequent to the formation of the first stitch and set in motion before the last feed movement is instituted for disconnecting said power means after the making of the last stitch.

2. In an automatic wire stitcher, stitching and work feeding mechanisms operating alternately to form a series of spaced stitches, means dependent upon the insertion of a work piece into the machine for setting said mechanism in motion, means for stopping the operation of said mechanisms comprising a control mechanism which must pass through a predetermined cycle before it can become effective to stop the stitching and feeding operations, and means dependent upon work travel subsequent to the formation of the first stitch for setting said control mechanism in operation.

3. In an automatic wire stitcher, a shaft, work feeding mechanism and work stitching mechanism arranged to be operated alternately through said shaft, means set in motion by the introduction of work into the machine for applying power to said shaft, control mechanism adapted to be operatively connected with said shaft for disconnecting said power means after the control mechanism has proceeded through a predetermined cycle, and means dependent upon work travel subsequent to the formation of the first stitch for causing said control mechanism to function to disconnect said power means after the final stitch is made.

4. In an automatic wire stitcher, a shaft, work feeding mechanism and work stitching mechanism arranged to be operated alternately through said shaft, means set in motion by the introduction of work into the machine for applying power to said shaft, control mechanism adapted to be operatively connected with said shaft for disconnecting said power means after the control mechanism has proceeded through a predetermined cycle, and means dependent upon work travel subsequent to the formation of the first stitch for operatively connecting said control mechanism to said shaft prior to the final stitching operation, said control mechanism being arranged to disconnect said power means after the final stitch is made.

5. In an automatic wire stitcher, a motor, a driven shaft, a clutch intermediate said motor and driven shaft, work feeding mechanism operated through said driven shaft, stitching mechanism operated through said driven shaft, means set in motion by the introduction of work into the machine for engaging said clutch, automatically started control mechanism for disengaging said clutch at the end of a predetermined cycle of operation of the control mechanism, automatic means for interrupting the operation of the control mechanism prior to the completion of its cycle, and means dependent upon the work travel prior to the final stitching operation for resuming the operation of said control mechanism.

6. In an automatic wire stitcher, a motor, a driven shaft, a clutch intermediate said motor and driven shaft, work feeding mechanism operated through said driven shaft, stitching mechanism operated through said driven shaft, means set in motion by the introduction of work into the machine for engaging said clutch, control mechanism operatively connected with said driven shaft for disengaging said clutch at the end of a predetermined cycle of operation of the control mechanism, automatic means for interrupting the operation of the control mechanism at a predetermined point in its cycle, and means dependent upon work travel prior to the final stitching operation for resuming the operation of said control mechanism.

7. In an automatic wire stitcher, a motor, a driven shaft, a clutch intermediate said motor and driven shaft, work feeding mechanism operated through said driven shaft, stitching mechanism operated through said driven shaft, means set in motion by the introduction of work into the machine for engaging said clutch, automatically started control mechanism for disengaging said clutch at the end of a predetermined cycle of operation of the control mechanism, automatic means for interrupting the operation of the control mechanism prior to the completion of its cycle, and means dependent upon work travel for resuming the operation of said control mechanism when the position for the last stitch arrives at a predetermined distance from the stitching point.

8. In an automatic wire stitcher, a motor, a driven shaft, a clutch intermediate said motor and driven shaft, work feeding mechanism operated through said driven shaft, stitching mechanism operated through said driven shaft, means set in motion by the introduction of work into the machine for engaging said clutch, control mechanism operatively connected with said driven shaft for disengaging said clutch at the end of a predetermined cycle of operation of the control mechanism, automatic means for interrupting the operation of the control mechanism at a given point in its cycle, and means dependent upon work travel for resuming the operation of said control mechanism in time to drive a predetermined number of stitches before the clutch is disengaged.

9. In an automatic wire stitcher, a motor, a driven shaft, work feeding mechanism and work stitching mechanism operated through said driven shaft, control mechanism for stopping said feeding and stitching mechanisms, means dependent upon the insertion of work into the machine for starting the machine and inaugurating the operation of said control mechanism, means inherent in the control mechanism for interrupting its operation at a predetermined point in its cycle, and means dependent upon the travel of the work through the machine for resuming the operation of the control mechanism at a predetermined point in that travel.

10. In an automatic wire stitcher, a shaft, work feeding mechanism and wire stitching mechanism arranged to be operated alternately through said shaft to form a series of aligned stitches, means set in motion by the introduction of work into the machine for applying power to said shaft, control mechanism for disconnecting said power means after the control mechanism has proceeded through a given cycle, a clutch for connecting said control mechanism with said shaft, automatic means for disconnecting said clutch after the shaft begins its rotation, and means set in motion by the travel of the work through the machine for engaging said clutch before the position for the last stitch reaches the stitching point.

11. In an automatic wire stitcher, a motor, a driven shaft, a clutch intermediate said motor and driven shaft, work feeding mechanism and work stitching mechanism operated through said driven shaft, means set in motion by the introduction of work into the machine for engaging said clutch, control mechanism operatively connected with said driven shaft for disengaging said clutch at the end of a predetermined cycle of operation of the control mechanism, automatic means independent of work travel for interrupting the operation of the control mechanism at a predetermined point in its cycle, and means dependent upon work travel prior to the final stitching operation for resuming the operation of said control mechanism.

12. In an automatic wire stitcher, a shaft, work feeding mechanism and work stitching mechanism arranged to be operated alternately through said shaft, means set in motion by the introduction of work into the machine for applying power to said shaft, means operating at the end of a predetermined cycle for disconnecting said power means, and an electric circuit including a switch arranged to be operated by the travel of work through the machine for setting said disconnecting means in motion before the last stitch is made.

13. In a machine for stitching down a box side seam flap either inside or outside of the adjacent box side, an open stitcher head, upwardly and downwardly extending fingers carried by said head normally closing a circuit, said fingers being adapted to be diverted away from circuit closing position, one by a box side and the other by said flap, and means under the control of said circuit for automatically stopping the stitching mechanism at the end of the seam.

14. In an automatic wire stitcher, a motor, stitching and work feeding mechanisms operative alternately, a main clutch intermediate said motor and said mechanisms, control means for uncoupling said main clutch, an auxiliary clutch for said control means, and means actuated by movement of the work for controlling said auxiliary clutch.

15. In an automatic wire stitcher, a motor, stitching and work feeding mechanisms operative alternately, a clutch intermediate said motor and mechanisms, means actuated by the work article for coupling said clutch, means for uncoupling said clutch and electrical means actuated by the work article for setting said uncoupling means in operation.

16. In an automatic wire stitcher, a motor, a driven shaft, a clutch intermediate said motor and driven shaft, work feeding mechanism and work stitching mechanism operated through said driven shaft, work delivering mechanism, means for controlling the operation of said feeding and delivery mechanisms, the operation of said control means being started through motion derived from the insertion of the work, being interrupted for an indeterminate interval, and being resumed by work travel, said control means being arranged to complete a given cycle and then to stop the machine.

17. In an automatic wire stitcher, a table, a motor, a stitching mechanism arranged above the table, a work feeding roller extending upwardly through the table, a delivery roller extending upwardly through the table behind said feeding roller, means controlled by movement of the work for rendering said feeding roller and said stitcher operative, and means for rendering said stitching mechanism and feeding roller inoperative and said delivery roller operative, said last named means being disconnected automatically after the machine is started and being resumed by work travel.

18. In an automatic wire stitcher, a motor, a driven shaft, a main clutch intermediate said motor and driven shaft, work feeding mechanism and work stitching mechanism operated alternately from said driven shaft, a cam shaft, a clutch for operatively connecting said shafts, electrical means for controlling the engagement and disengagement of said main clutch and said cam shaft clutch, means actuated by the introduction of work into the machine for causing said electrical means to engage said main clutch, said cam shaft at the end of a complete revolution being adapted to set said electrical means in operation to disengage said main clutch, timing means operated by said cam shaft for causing said electrical means to disengage the cam shaft clutch after the cam shaft has completed a predetermined portion of a revolution, and means operated by work travel for causing said electrical means to reengage said cam shaft clutch.

19. In a machine for stitching together two side edges of a box blank, an open stitcher head, an electric circuit comprising a spring finger carried by said head and normally in circuit closing position, said finger being adapted to be diverted away from circuit closing position by one of said box edges, and means under the control of the circuit when said finger returns to normal position after the passing of said box side edge for automatically stopping the stitching mechanism.

WILLIAM R. SPILLER.